United States Patent
Fergen et al.

(10) Patent No.: US 11,254,119 B2
(45) Date of Patent: Feb. 22, 2022

(54) IMAGE INSPECTION METHOD WITH LOCAL IMAGE RECTIFICATION

(71) Applicant: HEIDELBERGER DRUCKMASCHINEN AG, Heidelberg (DE)

(72) Inventors: Immanuel Fergen, Karlsruhe (DE); Frank Schumann, Heidelberg (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 485 days.

(21) Appl. No.: 16/257,401

(22) Filed: Jan. 25, 2019

(65) Prior Publication Data
US 2019/0291409 A1    Sep. 26, 2019

(30) Foreign Application Priority Data
Mar. 22, 2018 (DE) .......................... 102018204362.0

(51) Int. Cl.
*B41F 33/00* (2006.01)
*G06T 7/00* (2017.01)

(52) U.S. Cl.
CPC ...... *B41F 33/0036* (2013.01); *B41F 33/0009* (2013.01); *G06T 7/001* (2013.01)

(58) Field of Classification Search
CPC .................................................. B41F 33/009
See application file for complete search history.

(56) References Cited

U.S. PATENT DOCUMENTS

| 6,907,132 | B1 | 6/2005 | Salomon |
| 7,262,880 | B2 | 8/2007 | Geissler et al. |
| 2005/0240376 | A1* | 10/2005 | Uwatoko ........... H04N 1/00015 702/183 |
| 2014/0232891 | A1 | 8/2014 | Cassanego |
| 2019/0246005 | A1* | 8/2019 | Fergen ................... G06K 9/036 |

FOREIGN PATENT DOCUMENTS

| DE | 10218068 A1 | 11/2002 |
| DE | 102018201794 B3 | 4/2019 |
| JP | 2003141520 A | 5/2003 |

* cited by examiner

*Primary Examiner* — Matthew G Marini
*Assistant Examiner* — Marissa Ferguson-Samreth
(74) *Attorney, Agent, or Firm* — Laurence A. Greenberg; Werner H. Stemer; Ralph E. Locher

(57) ABSTRACT

A method for image inspection on printed products in a printing material processing machine. Printed products are recorded and digitizing and the recorded images are compared with a digital reference image to find image areas with distorted regions. Suitable rectification factors are calculated and the digital reference image is rectified with suitable rectification factors for the distorted image areas. The modified digital reference image is then compared to images recorded during the production run. If deviations are found, the printed products are found defective and removed. The computer also identifies image areas in the reference image that do not have enough edges for calculating suitable rectification factors and inserts anchors into the image areas. The anchors are printed, recorded and digitized, as they become part of the recorded digital printed image. In that case, the computer calculates the local rectification factors by way of the anchors.

8 Claims, 4 Drawing Sheets

IMAGE INSPECTION METHOD WITH LOCAL IMAGE RECTIFICATION

CROSS-REFERENCE TO RELATED APPLICATION

This application claims the priority, under 35 U.S.C. § 119, of German patent application DE 10 2018 204 362.0, filed Mar. 22, 2018; the prior application is herewith incorporated by reference in its entirety.

BACKGROUND OF THE INVENTION

Field of the Invention

The invention lies in the field of printing technology and, more particularly, in the field of quality control. Specifically, the invention deals with a method of inspecting images on printed products in a machine for processing printing material.

In the modern printing industry, in particular in larger printing machines, quality control is carried out in an automated way by what are known as in-line inspection systems, which will be referred to herein as image recording systems. In this case, in-line means that the image recording system, or, to be more precise, the camera of the image recording system, is disposed in the printing machine. In general, the camera is disposed downstream of the last printing unit or downstream of a further treatment unit such as a varnishing unit if such a unit is provided and records the printed products that have been produced in the printing machine. There may be a single camera or a camera system including a plurality of cameras. The use of other image sensors is likewise possible. For reasons of simplicity, only the term "camera" will be used herein. An image processor then compares the digitized printed images that have been created by means of the camera in this way to a corresponding good image of the image to be printed. These good images may be created on the basis of preprint data or they are taught in. In this case, teaching-in or training means that a number of printed products bearing the image to be printed are printed and recorded by the camera of the image recording system. These sample prints ought to be as defect-free as possible and therefore, having been recorded by the image recording system, they are saved on the image processor as good images to act as a digital reference. In the production run, the printed image that has been created or parts thereof are recorded by the camera of the image recording system and are compared with the reference image that has been digitally taught-in or created in the preprint process. If deviations are found between the printed products that are being produced in the production run and the digital reference, these deviations are shown to the operator, who may then decide whether these deviations are acceptable or whether the printed products that have been created in this way need to be removed because they are waste. The printed products that have been found to be waste may be removed by a waste removal switch. Two aspects that are of major importance in this process are that the reference image needs to be without any defect and that the actual image that has been printed and recorded by the image recording system truly corresponds to what has actually been printed. Defects that are created by the image recording system, for instance due to a lack of illumination, a contaminated lens of the camera, or other influences, must not have any negative influence on the inspection process.

A very specific problem that actually has a negative effect on the inspection process is that irregularities may occur when the printing substrate is transported within the printing machine. To make high-quality recordings, it is essential for the image recording system that the transported printing substrate is transported past the camera of the image recording system as smoothly and evenly as possible. This is a great challenge especially for sheet-fed printing machines. A known problem in this context is that the trailing edge of print sheets that are being transported starts to vibrate as the trailing edge is being transported over the sheet-guiding plate—it may flip upward and start to "flutter." Although this phenomenon is not a problem when images in the leading portion or at the center of the sheet are to be recorded, the fluttering has a negative influence on the recording of printed images that are positioned at the trailing portion of the sheet because the varying distance between the sheet surface and the camera will cause a slight varying blurriness in the form of a non-linear local distortion in the recorded print. Since this blurriness is not present in the digital reference image, it will be classified as a print defect when the scanned and recorded print is compared to the digital reference image. Of course if the image inspection process is manually monitored by human operators, they will realize that these defects are not real print defects but false positives and will treat the defect report accordingly. For a fully automated image inspection, however, it would be necessary to eliminate such false positives or pseudo-defects in advance.

A common approach to compensating for such distortions is to rectify the reference image.

Thus Japanese Patent Application No. JP 2003 141520 A discloses an image reading device including modules for compensating for geometric distortion from tilted scanning by means of a distortion factor that is adapted to local variations of the distortion. However, the local image distortion factor that is applied therein does not correspond to the blurriness that is caused by a movable image, i.e. a print sheet. In addition, the method disclosed therein only provides compensation for linear distortions and not for non-linear distortion as it may occur in sheet-fed offset printing due to the aforementioned fluttering of the trailing edge of the sheet.

To solve this problem, the yet unpublished German Patent Application No. DE 102018201794.8 discloses a method for image inspection on printed products in a machine processing printing materials by means of a computer, wherein in the course of the image inspection process, an image recording system records the produced printed products by means of at least one image sensor and digitizes the image. The recorded digital prints that have been created in this way are compared to a digital reference image by means of the computer after the computer has subjected the digital reference image to a rectification process. In the case of deviations of the recorded digital prints from the digital reference image, the printed products that have been found to be defective are removed. The method is characterized in that before rectifying the digital reference image, the computer compares the recorded digital prints with the digital reference image, analyzes the result of the comparison to find image areas with distorted regions in the recorded digital print, calculates suitable rectification factors for these distorted image areas and implements the process of rectifying the distorted image areas in the digital reference image using the suitable rectification factors that have been calculated.

A disadvantage of that approach is, however, that it only works for images to be printed that contain image objects with sufficient corners and edges. These edges and corners are necessary for a reliable identification of areas that have local distortions in the differential image. If, however, the image does not have a sufficient number of such corners and edges, the method cannot be used. Such image areas without corners and edges are areas without any conspicuous lines or transitions between image objects. For instance, in a photograph, they may be areas that represent the sky and clouds. The clouds are visible objects that are influenced for the described non-linear local distortions and thus cause false positives in the image inspection process, but they do not have corners or edges that may be used to localize the non-linear local distortions in a corresponding way. In such a case, the non-linear local distortions cannot be compensated for and continue to cause pseudo-defects in the digital image inspection process.

SUMMARY OF THE INVENTION

It is accordingly an object of the invention to provide a method for inspecting images which overcomes the above-mentioned and other disadvantages of the heretofore-known devices and methods of this general type and wherein local non-linear distortions may be compensated for even in images containing areas without corners and edges that are easy to locate.

With the foregoing and other objects in view there is provided, in accordance with the invention, a computerized method of image inspection on printed products in a machine for processing printing materials. The method comprises:

recording and digitizing a printed product by at least one image sensor in a course of an image inspection process carried out by an image recording system to form a recorded digital printed image;

comparing the recorded digital printed image with a digital reference image by a computer and checking with the computer for image areas with distorted regions in the recorded digital printed image;

calculating with the computer suitable rectification factors for the image areas with distorted regions;

rectifying the digital reference image using the calculated suitable rectification factors for the distorted image areas to generate a modified reference image;

identifying with the computer image areas in the digital reference image that do not have enough edges for calculating suitable rectification factors, inserting anchors into the image areas, printing the anchors on the printed products and recording and digitizing with the at least one image sensor, the anchors becoming part of the recorded digital printed image, and calculating with the computer the local rectification factors with reference to the anchors;

comparing the modified reference image by the computer with digital printed images recorded during a continuing production run; and when deviations are found in the recorded digital printed images from the modified reference image, removing printed products that have been found to be defective.

In other words, the above and other objects are attained by a method for image inspection on printed products in a machine processing printing materials by means of a computer, the method comprising the steps of recording and digitizing produced printed products by at least one image sensor in the course of the image inspection process carried out by means of an image recording system, comparing the recorded digital printed images and a digital reference image by means of the computer, checking the result of the comparison for image areas with distorted regions in the recorded digital printed image by means of the computer, calculating suitable rectification factors for said distorted image areas by means of the computer, rectifying the digital reference image using the calculated suitable rectification factors for said distorted image areas by means of the computer and comparing the digital reference image that has been modified in this way, by means of the computer, to digital printed images that are recorded during the production run and, if deviations occur in the recorded digital printed images from the digital reference image, removing printed products that have been found to be defective. The method is characterized in that the computer identifies image areas in the digital reference image that do not have enough edges for calculating suitable rectification factors, inserts anchors into said image areas. Said anchors are printed when the printed products are being printed, and are recorded and digitized by the at least one image sensor, becoming part of the recorded digital printed image. Then the computer calculates the local rectification factors by means of said anchors.

The method of the invention is used for inspections of printed images that include such corresponding image areas that do not have the required image content in the form of corners and edges that may easily be located to identify the image areas having the local non-linear distortions by creating a differential image. To make this possible, the computer analyzes the image to find whether there are areas that have the characteristics described above and which areas they are. Then the computer inserts additional anchors that have the required characteristics. These anchors of course need to be printed in a corresponding way when the corresponding images are printed. They are then recorded and digitized with the image by the image sensor and are an integral part of the printed image to be inspected, a fact which becomes effective when the differential image is created. The calculation of the local rectification factors may then be achieved on the basis of the anchors that have additionally been inserted. Consequently, the method for image inspection including compensation for local non-linear distortions may also be used for images with image areas that are in fact unsuitable for the process.

Advantageous and thus preferred further developments of the method will become apparent from the associated dependent claims and from the description together with the associated drawings.

In accordance with an added feature of the invention, the anchors are inserted at the margin of the digital reference image and are thus outside a trimming frame of the produced printed product. Of course, the anchors must not modify the actual print. They are thus placed at the marginal regions of the respective print, allowing them to be cut off once the print image product has been printed. The trimming frame required for this purpose ought to be big enough, i.e. the anchors ought to be placed as close to the edge of the printed image as possible so that as little as possible of the actual print to be produced is lost when the printed product that has been produced is trimmed at a later point.

In accordance with an additional feature of the invention, the anchors are inserted at the margin of the digital reference image by means of the computer in the preprint department. In this process, the anchors are inserted into the marginal regions of the digital reference image by a computer in the preprint department. The type and exact position of the anchors are defined at a preprint stage. At the same time, the anchors are also inserted into the digital original in the course of the preprint stage to ensure that they will later actually be printed. In accordance with the method, the printed image is then recorded by the image sensor and digitized so the anchors are present at the margin in both cases when the comparison between the digital reference image and the recorded digitized printed image is made. In accordance with the method of the invention, while the anchors are inserted at a preprint stage of the printing operation, the calculation and compensation for the local non-linear distortions is carried out in the image recording computer of the printing machine during the printing operation.

A preferred further development of the method of the invention in this context is that the calculation of the rectification factors is carried out individually for the specific recorded digital printed images of the respective print job during a teach-in or training phase of the image recording system at the beginning of every print job. The detection of distorted image areas and the corresponding calculation of the rectification factors that are suitable for this purpose may be carried out during the training phase of the image recording system. Such a training phase is necessary anyway at the beginning of every print job. This means that the image recording system is ready to apply the method of the invention right at the beginning of the actual production run of the print job. Of course, the detection of the distorted areas by means of the comparison between the digital reference image and the recorded actual printed image is only possible for the respective specific printed images. In this respect, it is irrelevant for the functioning of the method of the invention whether individual prints that are located in the corresponding substrate areas are compared to one another individually or whether they are compared as kind of a combined total image.

A further preferred further development of the method is to calculate the rectification factors, during a training phase of the image recording system at the beginning of every print job, the computer compares a plurality of recorded digital printed images to the digital reference image, making a selection from the results of said comparison by means of mathematical operators. Since in the course of the training phase of the image recording system, the method of the invention is implemented for a plurality of recorded digital print images, the identification of the distorted image areas and the resultant calculation of the local rectification factors as a function of the identification may be refined in a corresponding way. This is an important aspect especially because the unstable transport of the printing substrates always has a similar defect pattern in the form of local non-linear distortions, but the exact effect of the fluttering of the trailing edge of the sheet on the local distortion may differ slightly from image recording to image recording. Thus it is expedient to make a plurality of recordings and analyze them in accordance with the invention to be able to counterbalance these fluctuations in a corresponding way and also to counterbalance any other measurement errors that may occur in the image recording process by means of the image recording system at any time. The plurality of results that have been established in this way allow the distortion to be established as close to reality as possible by means of various mathematical operators. This realistic distortion may then be used to calculate local rectification factors that are optimally suited for the purpose.

In accordance with another feature of the invention, the selection made by the computer by means of mathematical operators comprises calculating averages, medians, minima, and maxima of the results of the comparison. The specific mathematical operators that are used in each case depend on the specific priorities. The most expedient process seems to be to use the average values obtained from the plurality of results for the local image distortion. However, if, against all odds, there is a large variation among the established values, the use of median values may make sense. In some individual cases, even the use of minimums and maximums in terms of the local image distortions may be expedient.

In accordance with again a further feature of the invention, in addition or as an alternative to rectifying the digital reference image, the computer rectifies the current recorded digital printed image to be compared before comparing the recorded digital printed images to the digital reference image. As mentioned above, instead of rectifying the digital reference image in a corresponding way and to distort all artifacts, it is likewise possible to rectify the respective recorded digital printed image in a corresponding way. However, a disadvantage of this process is that the calculated rectification factors need to be reapplied every time for every recorded digital printed image before the comparison with the digital reference image may be made. An advantage of the inverse process, i.e. of rectifying the digital reference image is that an adaptation by applying the calculated local distortion factors needs to be made only once for the print image in question.

A further preferred further development of the method of the invention is that at regular intervals during the image inspection, updated rectification factors are calculated for the distorted image areas based on current recorded digital printed images and said updated rectification factors are used to modify the digital reference image in a corresponding way. Once the digital reference image has been smoothed in a corresponding way, it may be used in the course of the regular image inspection process for all digital prints that have been recorded in a corresponding way without the need for a reapplication of the calculated local rectification factors. Nevertheless it may absolutely make sense to reapply the method of the invention to the digital reference image at regular intervals because the local distortion effects that are caused by a unstable transport of the printing substrate may well change in the course of a printing operation.

In accordance with yet an additional feature of the invention, the machine that processes printing materials is a sheet-fed printing machine and the produced printed products are printed onto print sheets. In principle, the method of the invention may be used for most types of printing machines. Especially the specific local distortions caused by the transportation of the substrate, however, above all occur in the context of print sheets because the corresponding vibrations, i.e. the fluttering ends of the sheets, in particular occur when individual sheets hit the sheet-guiding plates. Consequently, the method of the invention is particularly suitable for sheet-fed printing machines and for inspecting images on printed products that have been produced in such a sheet-fed printing machine.

In accordance with a concomitant feature of the invention, the sheet-fed printing machine is an inkjet or lithographic offset printing machine. The method of the invention is currently used mainly in sheet-fed lithographic offset printing machines. Nevertheless, using it in the context of inkjet printing machines is entirely conceivable.

Other features which are considered as characteristic for the invention are set forth in the appended claims.

Although the invention is illustrated and described herein as embodied in Image Inspection with Local Image Rectification, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
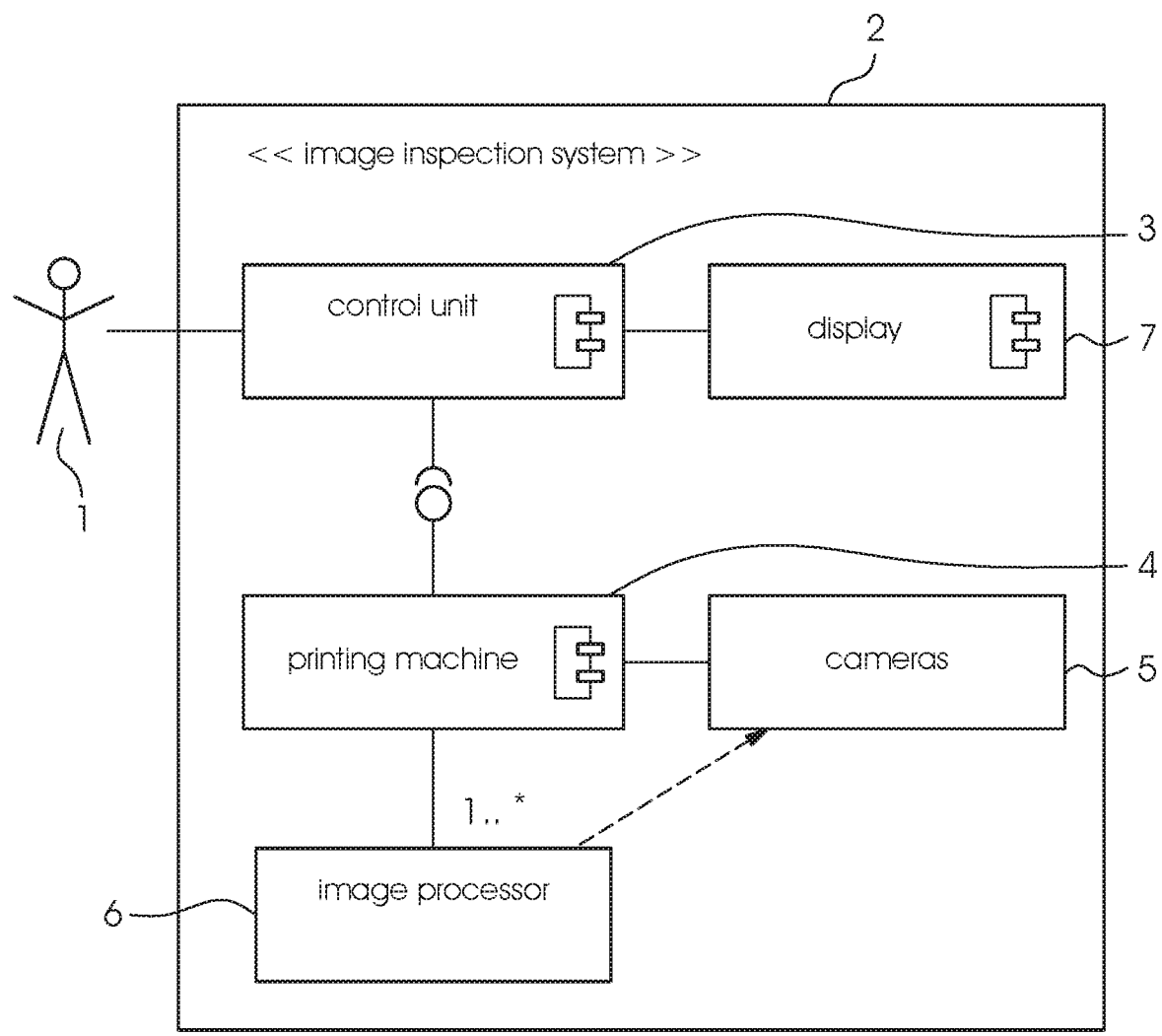
FIG. 1 illustrates an example of an image recording system.

Referring now to the figures of the drawing in detail and first, particularly, to FIG. 1 thereof, there is shown an example of an image inspection system, or image recording system 2, implementing the method of the invention. The image recording system 2 consists of at least one image sensor 5, usually a camera 5, integrated in the sheet-fed printing machine 4. The at least one camera 5 records the printed images generated by the printing machine 4 and transmits the data to a computer 3, 6 for analysis. The computer 3, 6 may be a separate computer 6, e.g. one or more dedicated image processors 4, or it may be identical with the control unit 3 of the printing machine 4. At least the control unit 3 of the printing machine 4 has a display 7 for displaying the results of the image inspection process.

In a preferred exemplary embodiment, the printing unit is a sheet-fed lithographic offset printing press 4, although the method of the invention may just as well be used in an inkjet printing context.

Figure 2:
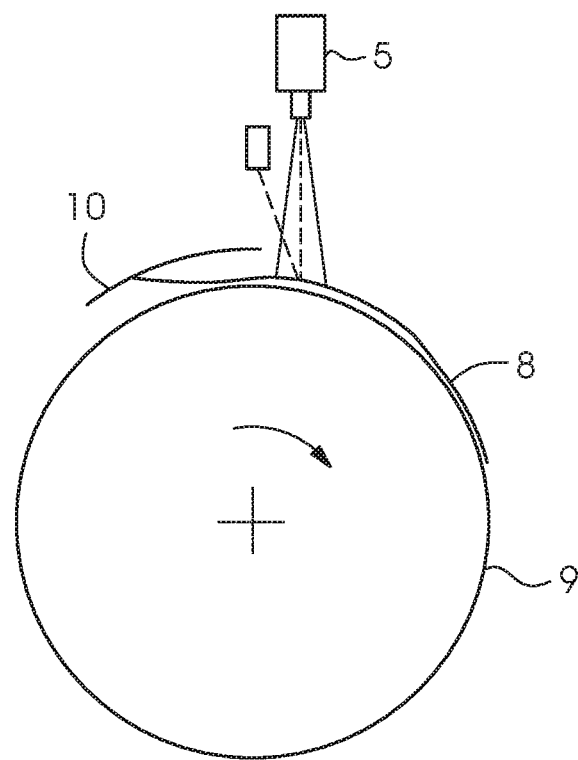
FIG. 2 illustrates an example of how the fluttering of the trailing edge of the sheet is created.

When the print sheet 8 is transported through the sheet-fed offset printing press 4, vibration occurs, in particular at the trailing end of the sheet, causing the sheet end to flutter. This fluttering has a negative impact on how the camera 5 of the image recording system 2 records the image. This phenomenon is structurally shown in FIG. 2. FIG. 2 indicates how the sheet is transported over the printing cylinder 9, controlled by a sheet-guiding plate 10. As soon as the sheet end leaves the guide plate 10, however, the mechanical stress that has built up in the sheet 8 as it has been transported between the printing cylinder 9 and the sheet-guiding plate 10 is discharged, resulting in the slight vibration that causes the fluttering. The camera 5, which is installed a shortly after the printing unit, records the sheet 8 that has just been printed and forwards the digitized printed image 14 that has been recorded in this way to the corresponding image processor 6. However, the slight fluttering causes the distance between the printed sheet 8 and the camera 5 to an image recording system 2 to vary slightly and at a high frequency. This causes slight distortions at the end of the fluttering sheet 8. These distortions result in pseudo-defects in the image inspection process. So far, these pseudo-defects have had to be analyzed manually by an operator 1 of the printing machine 4.

Figure 3:
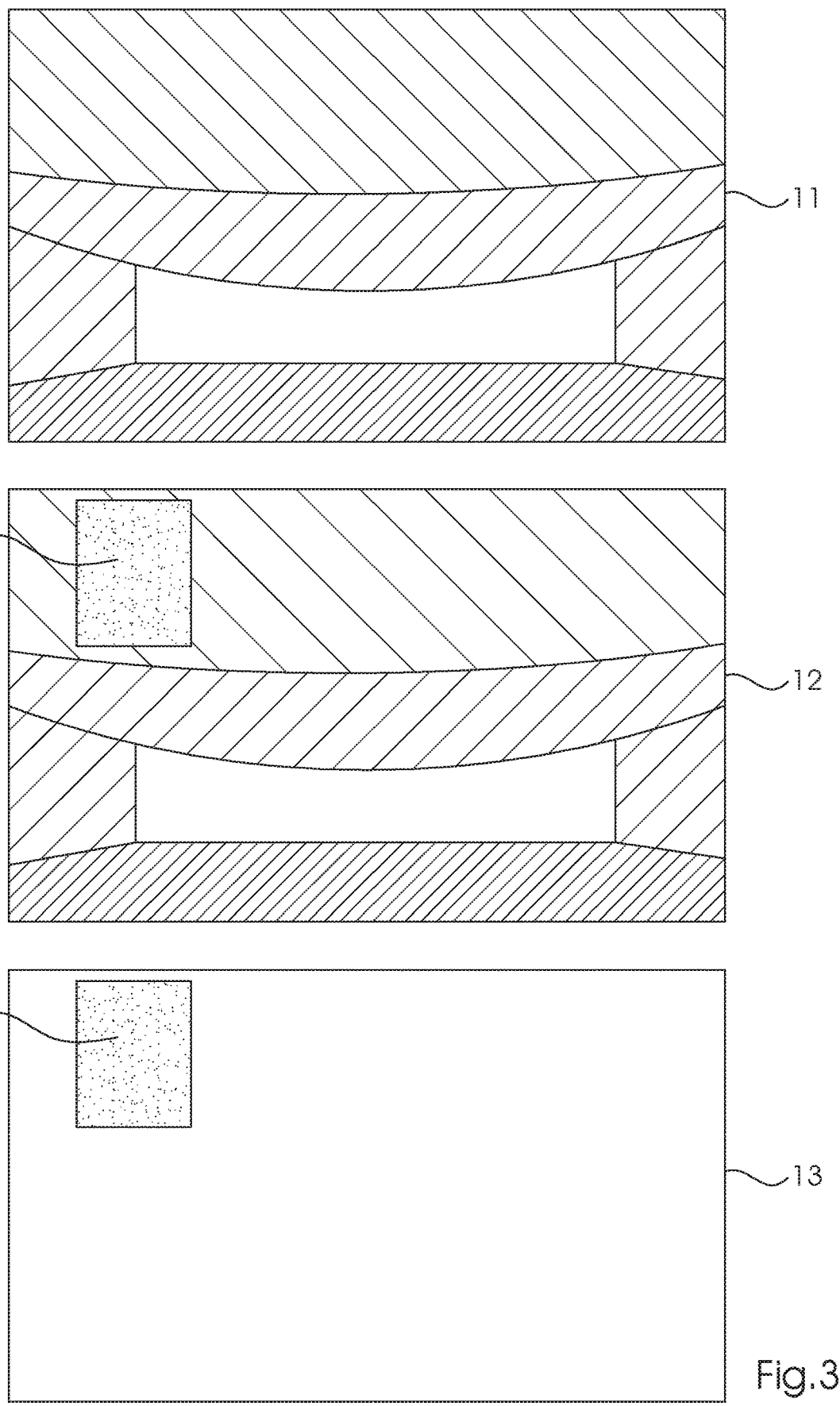
FIG. 3 illustrates the creation of the differential image for a print with an area that does not have any corners/edges.

FIG. 3 illustrates the problem of applying the image inspection process and compensation for non-linear local distortions in a case in which there are image areas that do not include a sufficient number of corners and edges. The example shown in the first part of FIG. 3 represents a digital preprint image 11 that has areas without edges. It schematically shows how the upper third of the image 11 has such an area depicting a cloudy sky, whereas the lower two thirds depict a building and the forecourt of this building and have enough edges. As shown in the second part of FIG. 3, once this image 11 has been printed, the fluttering of the sheet causes local non-linear distortions 14 among the clouds in the upper third and on the left side of the print image 12 that has been printed and recorded by the image recording system 2. The resultant differential image 13, which is shown in the third part of FIG. 3, accordingly illustrates these local non-linear distortions 14. Anyone can see that the cloudy areas that have been distorted in a non-linear way merely form a mist 14 that is difficult to come to grips with. It cannot easily be recorded in an automated way; therefore, the necessary local rectification factors cannot be calculated. Thus the default process of compensating for such non-linear distortions 14 cannot be used for this area.

Figure 4:
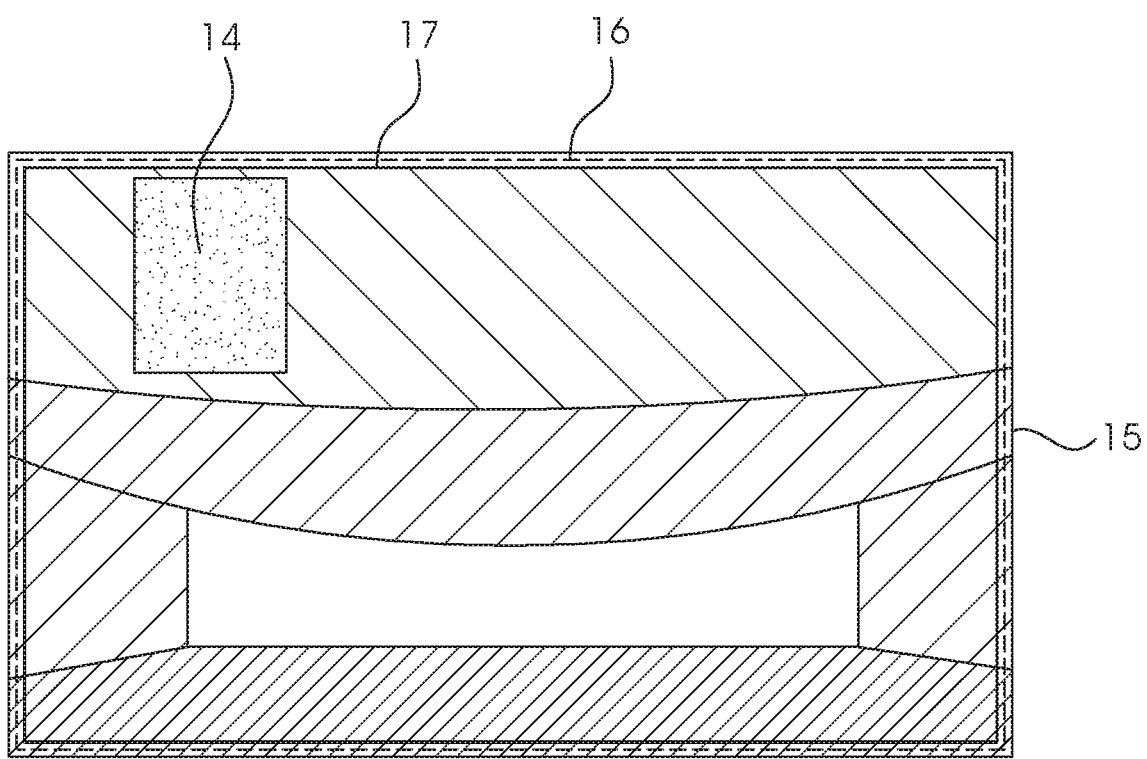
FIG. 4 illustrates a print with locally inserted anchors.

FIG. 4 illustrates the corresponding approach to a solution to this problem. At a preprint stage, the computer identifies such critical areas containing clouds, for instance. A suitable trimming frame 17 is placed over the digital preprint image 11 to determine the parts of the image 15 to be printed will then be cut off when the product receives further treatment. These areas that will be cut off later on are ideal for inserting additional anchors 16 that are generated in an automated way to allow the method for compensating for the non-linear local distortions 14 to be implemented after all. Since the printed images 15 are not trimmed until after the quality control process by means of the image recording system 2 has taken place, the anchors 16 that have digitally been inserted into the preprint image 11 may be printed and recorded by the camera 5 of the image recording system 2 along with the actual print. Therefore the digital preprint image 11, i.e. the reference image 11, and the printed and recorded digital print image 12, 15 may be compared in accordance with the invention by forming the differential image because now the differential image 13 has the required edges in the form of the anchors 16 that have been generated in an automated way. Even areas without any sharp corners and edges such as the clouds may now be easily rectified due to the anchors 17 that have been inserted. The parameters that have been established in this way are then used to calculate the local rectification factors in accordance with defined algorithms. These rectification factors are then used to rectify the respective areas of the reference image 11. Now the reference image 11 has been prepared in a way to ensure that it is suitable for image inspection purposes. An important aspect in this context is that the anchors 16 are only inserted in image areas where the actual print 11, 12 does not have enough natural corners and edges. Since the trimming frame 17 ought to cut off as little as possible of the print image 11, 12 the anchors will always be inserted at the outermost edge of the corresponding preprint image 11. However, since the local non-linear distortions 14 mostly occur at the end of the sheet anyway, this is no disadvantage in terms of the method of the invention.

The following is a summary list of reference numerals and the corresponding structure used in the above description of the invention:

1 operator 2 image recording system
3 control unit
4 printing machine
5 image sensor
6 image processor
7 display
8 print sheet
9 printing cylinder
10 guide plate
11 digital preprint image/reference image containing areas without edges
12 image that has been printed and recorded and exhibits non-linear distortions
13 blurry differential image without detectable edges
14 blurriness due to non-linear distortions without detectable edges
15 image that has been printed and recorded and includes inserted anchors
16 anchors that have been inserted outside the trimming margin
17 trimming margin

The invention claimed is:

1. A method of image inspection on printed products in a machine for processing printing materials, the method comprising:
　recording and digitizing a printed product by at least one image sensor in a course of an image inspection process carried out by an image recording system to form a recorded digital printed image;
　comparing the recorded digital printed image with a digital reference image by a computer and checking with the computer for image areas with distorted regions in the recorded digital printed image;
　calculating with the computer suitable rectification factors for the image areas with distorted regions;
　rectifying the digital reference image using the calculated suitable rectification factors for the distorted image areas to generate a modified reference image;
　identifying with the computer image areas in the digital reference image that do not have enough edges for calculating suitable rectification factors, inserting anchors into the image areas, printing the anchors on the printed products and recording and digitizing with the at least one image sensor, the anchors becoming part of the recorded digital printed image, and calculating with the computer the local rectification factors with reference to the anchors;
　comparing the modified reference image by the computer with digital printed images recorded during a continuing production run;
　when deviations are found in the recorded digital printed images from the modified reference image, removing printed products that have been found to be defective; and
　carrying out the step of calculating the rectification factors during a teach-in phase of the image recording system at a beginning of each separate print job individually and for the specific recorded digital printed images of a current print job by comparing with the computer a plurality of recorded digital printed images with the digital reference image, and making a selection from the results of the comparison by means of mathematical operators.

2. The method according to claim 1, which comprises inserting the anchors in a margin of the digital reference image and thus outside a trimming frame of the printed products.

3. The method according to claim 2, wherein the step of inserting the anchors at the margin of the digital reference image by the computer is carried out at a preprint stage of a printing operation.

4. The method according to claim 1, wherein the step of making the selection comprises calculating averages, medians, minima, and maxima of the results of the comparison.

5. The method according to claim 1, wherein in addition, or as an alternative, to rectifying the digital reference image, rectifying with the computer the current recorded digital printed image to be compared before comparing the recorded digital printed images to the digital reference image.

6. The method according to claim 1, which comprises, at regular intervals during the image inspection process, calculating updated rectification factors for the distorted image areas based on current recorded digital printed images and using the updated rectification factors to modify the digital reference image.

7. The method according to claim 1, wherein the machine for processing printing materials is a sheet-fed printing machine and the printed products are printed onto print sheets.

8. The method according to claim 7, wherein the sheet-fed printing machine is an inkjet or offset printing machine.

* * * * *